(12) United States Patent
Attar et al.

(10) Patent No.: US 7,477,622 B2
(45) Date of Patent: Jan. 13, 2009

(54) SUPERPOSITION CODING IN A WIRELESS COMMUNICATION SYSTEM

(75) Inventors: Rashid A. Attar, San Diego, CA (US); Kiran Kiran, La Jolla, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 521 days.

(21) Appl. No.: 11/046,267

(22) Filed: Jan. 28, 2005

(65) Prior Publication Data

US 2006/0171347 A1  Aug. 3, 2006

(51) Int. Cl.
*H04Q 7/00* (2006.01)
(52) U.S. Cl. .................. 370/329; 370/328; 370/341; 455/452.2; 455/450
(58) Field of Classification Search .............. 370/329, 370/328, 341; 455/452.2, 450
See application file for complete search history.

(56) References Cited

U.S. PATENT DOCUMENTS

| 2002/0012334 | A1* | 1/2002 | Strawczynski et al. | 370/337 |
| 2004/0047425 | A1* | 3/2004 | Itoh | 375/259 |
| 2004/0166869 | A1 | 8/2004 | Laroia et al. | 455/450 |
| 2006/0120321 | A1* | 6/2006 | Gerkis et al. | 370/329 |

OTHER PUBLICATIONS

Karabulut G., et al. "*Rate Design Rule for Superposition Coded Modulations*" Electrical and Computer engineering, 2004. Canadian Conference On Niagara Falls, Ont., Canada 205 May 2004. IEEE, US, May 2, 2004, pp. 365-368 vol. 1.
Youjian, Liu, et al. "*Optimal Rate Allocation for Superposition Coding in Quasi-Static Fading Channels*" International Symposium on Information Theory. IST 2002, Lausaane, Switzerland, Jun. 30-Jul. 5, 2002.
International Search Report (4 pgs.), Jun. 2006.
T.M. Cover, *Broadcast Channels*, IEEE Transactions on Information Theory, vol. IT-18, Issue 1, Feb. 14, 1972.

* cited by examiner

*Primary Examiner*—Danh C Le
(74) *Attorney, Agent, or Firm*—Larry J. Moskowitz; Thomas Rouse

(57) ABSTRACT

A system to communicate a superposition coded packet from a base station to a plurality of remote stations. At the base station, from a list of user candidates for superposition coding a most deserving user may be determined. Those user candidates with a requested data rate less than that of the most deserving user may be eliminated. A superposition coded packet may be compiled from the remaining user candidates. On receipt, the most deserving user may process the superposition coded packet by assuming a predetermined power allocation. Further, if a user successfully in decodes early, power may be re-allocated to another user.

37 Claims, 8 Drawing Sheets

FIG. 4A

| USER | DRC(n) (kbps) | F(n) (-) |
|---|---|---|
| 202 | 475.7 | 45 |
| 204 | 3098.3 | 23 |
| 206 | 656.7 | 13 |
| 208 | 521.3 | 14 |
| 210 | 304.7 | 18 |
| 212 | 3408.2 | 11 |
| 214 | 598.7 | 14 |
| 216 | 520.7 | 17 |
| 218 | 501.1 | 20 |
| 220 | 2414.0 | 10 |
| 222 | 601.4 | 14 |
| 224 | 75.7 | 05 |
| 226 | 467.6 | 03 |
| 228 | 976.8 | 09 |
| 230 | 401.5 | 04 |
| 232 | 576.8 | 22 |
| 234 | 1356.6 | 12 |
| 236 | 38.6 | 07 |
| 238 | 533.9 | 15 |
| 240 | 656.7 | 08 |

FIG. 4B

| USER | DRC(n) (kbps) | F(n) (-) |
|---|---|---|
| 236 | 38.6 | 07 |
| 224 | 75.7 | 05 |
| 210 | 304.7 | 18 |
| 230 | 401.5 | 04 |
| 226 | 467.6 | 03 |
| 202 | 475.7 | 45 |
| 218 | 501.1 | 20 |
| 216 | 520.7 | 17 |
| 208 | 521.3 | 14 |
| 238 | 533.9 | 15 |
| 232 | 576.8 | 22 |
| 214 | 598.7 | 14 |
| 222 | 601.4 | 14 |
| 206 | 656.7 | 13 |
| 240 | 656.7 | 08 |
| 228 | 976.8 | 09 |
| 234 | 1356.6 | 12 |
| 220 | 2414.0 | 10 |
| 204 | 3098.3 | 23 |
| 212 | 3408.2 | 11 |

FIG. 4C

| USER | DRC(n) (kbps) | F(n) (-) |
|---|---|---|
| 202 | 475.7 | 45 |
| 204 | 3098.3 | 23 |
| 232 | 576.8 | 22 |
| 218 | 501.1 | 20 |
| 210 | 304.7 | 18 |
| 216 | 520.7 | 17 |
| 238 | 533.9 | 15 |
| 222 | 601.4 | 14 |
| 214 | 598.7 | 14 |
| 208 | 521.3 | 14 |
| 206 | 656.7 | 13 |
| 234 | 1356.6 | 12 |
| 212 | 3408.2 | 11 |
| 220 | 2414.0 | 10 |
| 228 | 976.8 | 09 |
| 240 | 656.7 | 08 |
| 236 | 38.6 | 07 |
| 224 | 75.7 | 05 |
| 230 | 401.5 | 04 |
| 226 | 467.6 | 03 |

SUPERPOSITION CODING IN A WIRELESS COMMUNICATION SYSTEM

BACKGROUND

1. Field of the Invention

The present invention relates generally to methods and apparatus to schedule and wirelessly transmit information packets and more specifically to employ superposition coding to improve the forward link data throughput performance in a wireless communication system.

2. Background

There are a variety of wireless communication standards that may control the communication in a cellular communication system. The cdma2000 1xEV-DO standard ("cdma2000 High Rate Packet Data Air Interface Specification," TIA/EIA/IS-856) is a system for packet data communication developed by Qualcomm Inc., U.S.A. in the late 1990's to provide general data communication services in a wireless mobile environment. The 1xEV-DO system adopts intrinsic resource assignment methods corresponding to the characteristics of forward and reverse links.

Under the 1xEV-DO standard, the base station may transmit only one data packet to one cell phone during that moment in time. To determine which of the thirty cell phones in the example above may receive their data packet during a particular moment in time, the base station may utilize a pilot signal. In operation, a base station may continuously transmit pilot signals with a constant power. On receiving a pilot signal, a cell phone determines the intensity of the received pilot signal and sends the results back to the base station in the form of a requested Data Rate Control (DRC).

Fading is the probabilistic variation in the received intensity of a radio transmission. The phone's distance from the base station may affect the received pilot signal intensity. Also, dynamic events, such a truck passing between the cell phone and base station, the pilot signal reflecting off buildings to combine with or cancel the main pilot signal, may affect the received pilot signal intensity. In short, distance and interference conditions create disparity in this Forward Link Signal-to-Interference-and-Noise Ratio (FL SINR) and thus affect the requested DRC of each phone.

At the base station, a scheduler algorithm may rank each cell phone by its pilot signal intensity (namely, requested DRC) and utilize that ranking to determine which one cell phone may receive the next data packet. In some cases, a strongest cell phone's pilot signal intensity may be as much as 20 decibels (dBs) less than the next candidate ranked pilot signal intensity. In a typical intrinsic resource assignment method, the base station may send out that data packet which corresponds to the cell phone having the "most" deserving SINR. During that moment in time, the most deserving user's needs may be addressed while the needs of the remaining users (in the above example, the needs of twenty-nine users) may have to wait.

Conventional intrinsic resource assignment methods attempt to provide fair service to all cell phones. This leads to a problem in that the most deserving user limits the overall system data throughput performance. Moreover, users with FL SINRs that are higher than the FL SINR of the most deserving user are penalized with a lower than potential throughput and higher delays for their particular cell phone. Even though the most deserving user is given preference over many other users, it may be important to continue to meet the needs of the most deserving user. There is therefore a need in the art for a system that improves the forward link data throughput performance and diminishes the delays for users with FL SINRs that are higher than the FL SINR of the most deserving user while meeting the needs of the most deserving user.

SUMMARY

Embodiments disclosed herein address the above stated needs by limiting superposition coding to no more than four user candidates, one of which is the "most" deserving user, by selecting a 2-user, 3-user, or 4-user combination that maximizes the forward link data throughput performance of the wireless communication system, and by dynamically reallocating the power transmission at the start of each time slot interlace.

A system to communicate a superposition coded packet from a base station to a plurality of remote stations is disclosed. At the base station, a list of user candidates for superposition coding may be compiled and the most deserving user among the user candidates may be determined. An aspect of the invention limits superposition coding to no more than four user candidates. Those user candidates who have a requested data rate that may be less than a requested data rate of the most deserving user may be eliminated. A superposition coded packet may be compiled from the remaining user candidates. If a remote station receiving the superposition coded packet is the most deserving user, then that remote station may process the superposition coded packet by assuming alternatively that sixty percent and one hundred percent of a total transmitted power was allocated to the most deserving user. Further, if one or more users are successful in decoding before the nominal length of the data packet, their power may be re-allocated to the user with the next highest SINR.

The embodiments may be applied to a variety of applications. For example, when applied to a Voice-over-Internet Protocol (VoIP), the inventive superposition coding may allow for lower latencies (reduced transmission delays), a greater number of users per sector (namely, a higher capacity), or a combination of the two. When applied to broadcast services such as advertising, the broadcast services may be superposition coded with unicast traffic directed to an individual user so that both broadcast and unicast traffic may be transmitted together. Thus, unlike conventional wireless communication systems, the present invention minimizes or eliminates the need to preempt broadcast traffic with unicast traffic. In other words, broadcast traffic need not be compromised during periods of unicast traffic for those systems employing the present invention.

BRIEF DESCRIPTION OF THE DRAWINGS

FIG. 4A is a table listing each user 202 through 240, an example DRC for each user, and an example resulting evaluation function F(n) for each user;

FIG. 4B is a table listing of the contents of FIG. 4A as sorted by the DRC for each user;

FIG. 4C is a table listing of the contents of FIG. 4A as sorted by the resulting evaluation function F(n) for each user;

DETAILED DESCRIPTION

Figure 1:
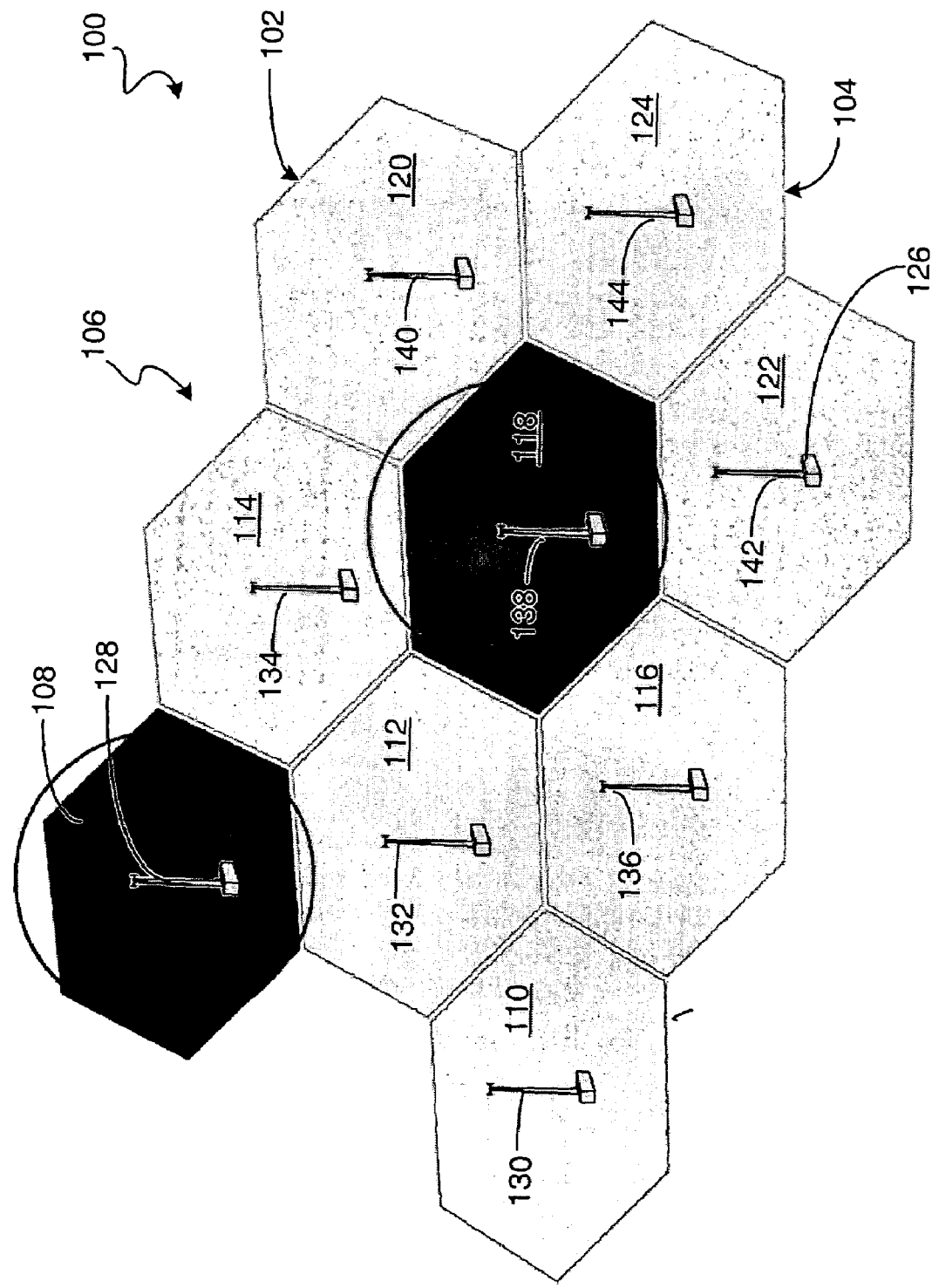
FIG. 1 is a perspective view of a wireless communication system 100.

Millions of people in the United States and around the world utilize cellular phones. One of the most interesting things about a cell phone is that it is actually a sophisticated radio. To provide communication, these sophisticated radios may be incorporated into a radiotelephone system such as a cellular system.

In a cellular system, a geographic area such as a city may be divided into a number of cells. Each cell may have a base station that includes a tower and a small building containing radio equipment. The base station within a cell may service the communication link needs of the cell phones located within that cell.

The communication link needs of a cell phone may be broken into two areas: reverse link (cell phone to base station link) and forward link (base station to cell phone link). During forward link operations, a base station may transmit data packets to the cell phones located within that cell. For example, at any one moment in time (e.g., during 1.67 milliseconds), the base station may have thirty different cell phone users requesting data.

There are a variety of wireless communication standards that may control the communication in a cellular communication system. The cdma2000 1xEV-DO standard ("cdma2000 High Rate Packet Data Air Interface Specification," TIA/EIA/IS-856) is a system for packet data communication developed by Qualcomm Inc., U.S.A. in the late 1990's to provide general data communication services in a wireless mobile environment. The 1xEV-DO system adopts intrinsic resource assignment methods corresponding to the characteristics of forward and reverse links.

Under the 1xEV-DO standard, the base station may transmit only one data packet to one cell phone during that moment in time. To determine which of the thirty cell phones in the example above may receive their data packet during a particular moment in time, the base station may utilize a pilot signal. In operation, a base station may continuously transmit pilot signals with a constant power. On receiving a pilot signal, a cell phone determines the intensity of the received pilot signal and sends the results back to the base station in the form of a requested Data Rate Control (DRC).

Fading is the probabilistic variation in the received intensity of a radio transmission. The phone's distance from the base station may affect the received pilot signal intensity. Also, dynamic events, such a truck passing between the cell phone and base station, the pilot signal reflecting off buildings to combine with or cancel the main pilot signal, may affect the received pilot signal intensity. In short, distance and interference conditions create disparity in this Forward Link Signal-to-Interference-and-Noise Ratio (FL SINR) and thus affect the requested DRC of each phone.

At the base station, a scheduler algorithm may rank each cell phone by its pilot signal intensity (namely, requested DRC) and utilize that ranking to determine which one cell phone may receive the next data packet. In some cases, a strongest cell phone's pilot signal intensity may be as much as 20 decibels (dBs) less than the next candidate ranked pilot signal intensity. In a typical intrinsic resource assignment method, the base station may send out that data packet which corresponds to the cell phone having the "most" deserving SINR. During that moment in time, the most deserving user's needs may be addressed while the needs of the remaining users (in the above example, the needs of twenty-nine users) may have to wait.

Conventional intrinsic resource assignment methods attempt to provide fair service to all cell phones. This leads to a problem in that the most deserving user limits the overall system data throughput performance. Moreover, users with FL SINRs that are higher than the FL SINR of the most deserving user are penalized with a lower than potential throughput and higher delays for their particular cell phone. Even though the most deserving user is given preference over many other users, it may be important to continue to meet the needs of the most deserving user. There is therefore a need in the art for a system that improves the forward link data throughput performance and diminishes the delays for users with FL SINRs that are higher than the FL SINR of the most deserving user while meeting the needs of the most deserving user.

FIG. 1 is a perspective view of a wireless communication system 100. Wireless communication system 100 may be a collection of individual communications networks, transmission systems, relay stations, tributary stations, and/or data terminal equipment capable of interconnection and interoperation to form an integrated whole. Wireless communication system 100 may include a geographic area 102 divided into a grid 104 containing a number of cells 106, here cells 108, 110, 112, 114, 116, 118, 120, 122, and 124. For example, a city or county may be divided into smaller cells. Cells 106 may vary in size depending upon terrain, capacity demands, and other factors. For example, in one embodiment each cell 106 has a hexagonal shape and is sized to about 10 square miles (26 square kilometers).

Wireless communication system 100 further may include a number of base stations 126, for example base stations 128, 130, 132, 134, 136, 138, 140, 142, and 144. Each cell 106 may have a base station 126. Base station 126 may be a radio transceiver (transmitter/receiver) that uses processing hardware/software, transmission power, and an antenna array to control and relay voice and data signals between two devices. Base station 126 may be a High Data Rate (HDR) base station apparatus and may be referred to as a Modem Pool Transceiver (MPT). By controlling the transmission power from each base station 126, radio frequencies assigned to each cell 106 may be limited to the boundaries of that particular cell. In this way, the same frequencies may be assigned to cell 108 and cell 118, for example.

Figure 2:
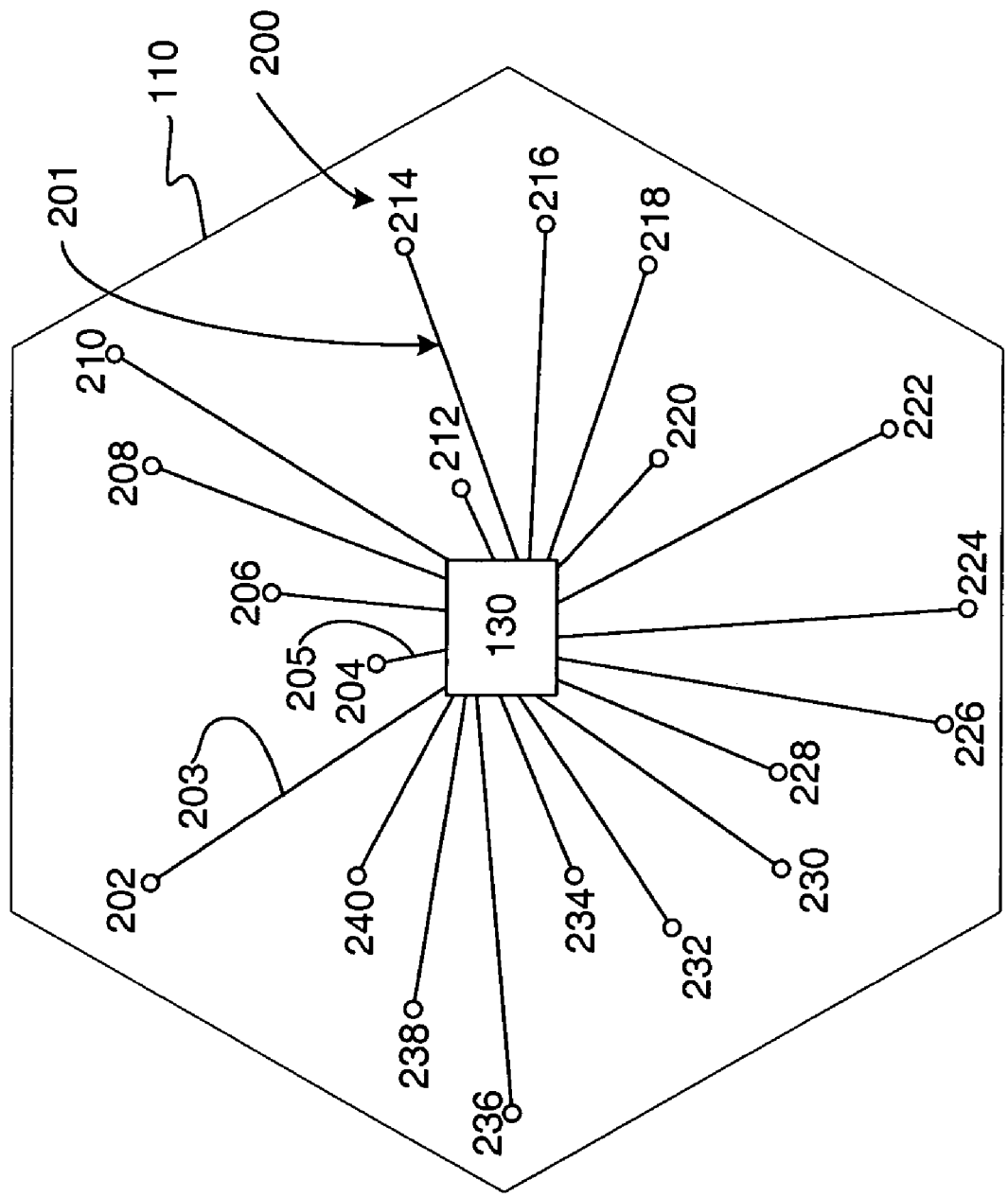
FIG. 2 is a detailed plan view of cell 110 of FIG. 1.

FIG. 2 is a detailed plan view of cell 110 of FIG. 1. Included within cell 110 may be ATs, such as ATs 202, 204, 206 . . . 240. An Access Antenna (AT) may be any data device that communicates through a wireless channel or through a wired channel, for example using fiber optic or coaxial cables. Moreover, an AT may further be any of a number of types of devices including but not limited to PC card, compact flash, external modem, internal modem, wireless phone, or wireline phone.

Each AT may be referred to as a user and may include a cell phone, a mobile station, a base mobile transceiver, a satellite, a mobile radiotelephone set, a base mobile transceiver, a remote station apparatus, or a High Data Rate (HDR) subscriber station. Moreover, each AT may be mobile or stationary and may be adapted to communicate data packets with one or more base station 126 (FIG. 1) through links 201. AT 200 may transmit and receive data packets through one or more base stations 126 to an HDR base station controller, which may be referred to as a Modem Pool Controller (MPC).

Modem pool transceivers and modem pool controllers may be parts of a network called an access network. An Access Network (AN) may be that portion of a public or private switched network that connects access nodes to individual subscribers. For example, an AN may transport data packets between multiple ATs. The AN may further connect to additional networks outside the AN, such as a corporate intranet or the Internet, and may transport data packets between each AT and such outside networks. Collectively or in portions thereof, these may be parts of wireless communication system 100.

An AT having established an active traffic channel connection with one or more base stations 126 may be referred to as an active AT. An active AT is said to be in a An AT having established an active traffic channel connection with one or more base stations 126 may be referred to as an active AT. An active AT is said to be in a traffic state. An AT that is in the process of establishing an active traffic channel connection with one or more base stations 126 is said to be in a connection setup state.

Links 201 (FIG. 2) may be radio interfaces that enabling the user of an AT, such as AT 214, to AN services provided by base station 130. For example, AT 202 may be adapted to communicate data packets with base station 130 through a link 203 and AT 204 may be adapted to communicate data packets with base station 130 through a link 205.

A data packet may be viewed as a block of data arranged in the form of a packet having a preamble and a payload. The preamble may carry overhead information about the content of the packet and destination address; and the payload may then be the user information. Typically, a base station transmits a data packet to one user at a time (single user packet) or to multiple users at a time (multi-user data packet).

Superposition coding is a technique where two or more data packets may be combined at the base station as a superposition coded packet and transmitted with scaled power to multiple users at a moment in time. As in T. M. Cover, *Broadcast Channels*, IEEE Transactions on Information Theory, IT-18 (1): Feb. 14, 1972, signals to different users are superposed on each other and transmitted with different powers in the same data packet. An aspect of the invention employs superposition coding to improve the data throughput capacity from a base station, such as base station 130 (FIG. 2), to ATs 200 in a wireless communication system 100. The superposition coded packets shared a common resource, namely "power;" while the multi-user packets share a common resource, namely "time."

Figure 3:
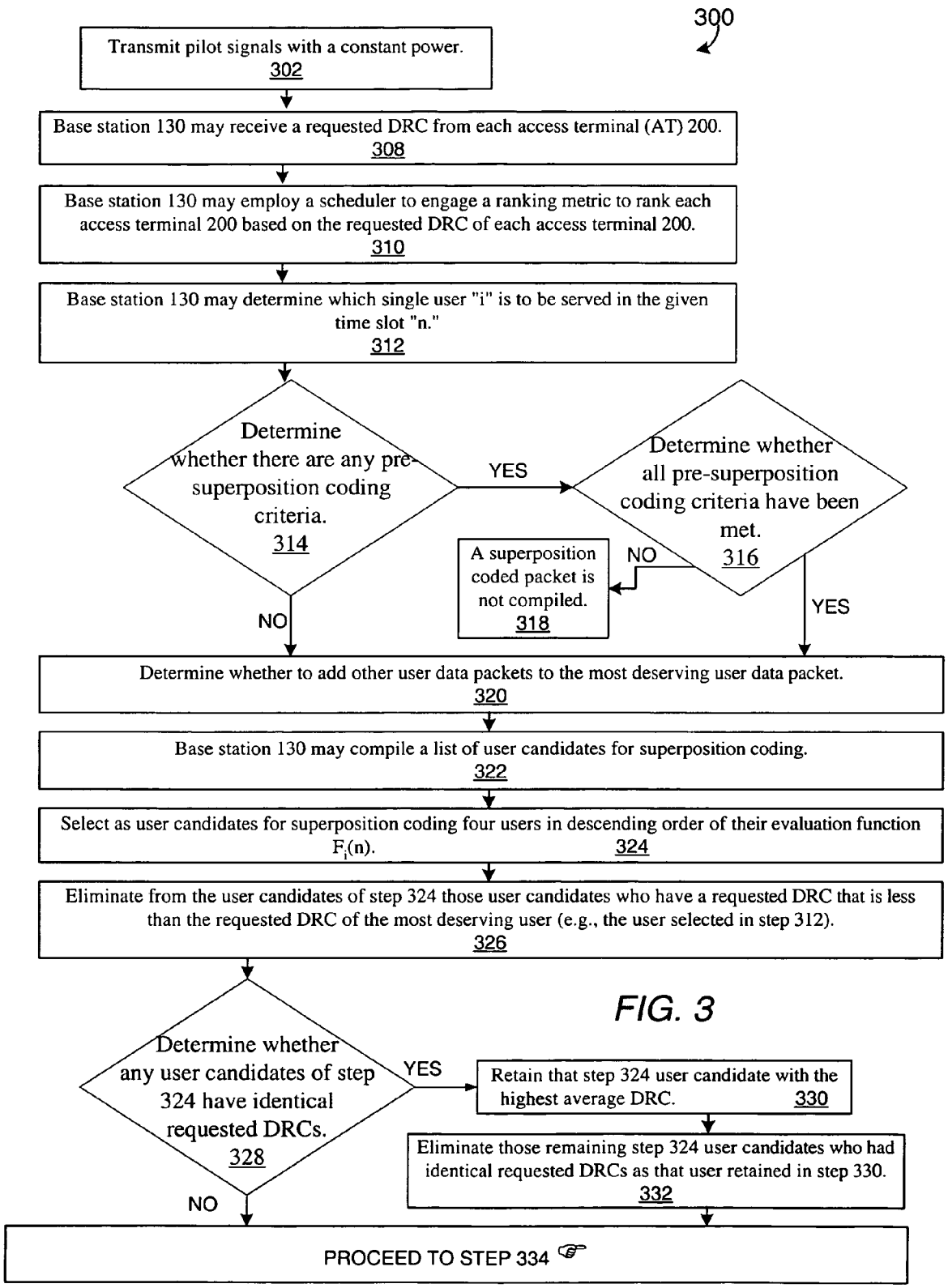
FIG. 3 is a method 300 to compile fixed length information packets into a superposition coded packet having an address header.
Figure 3:
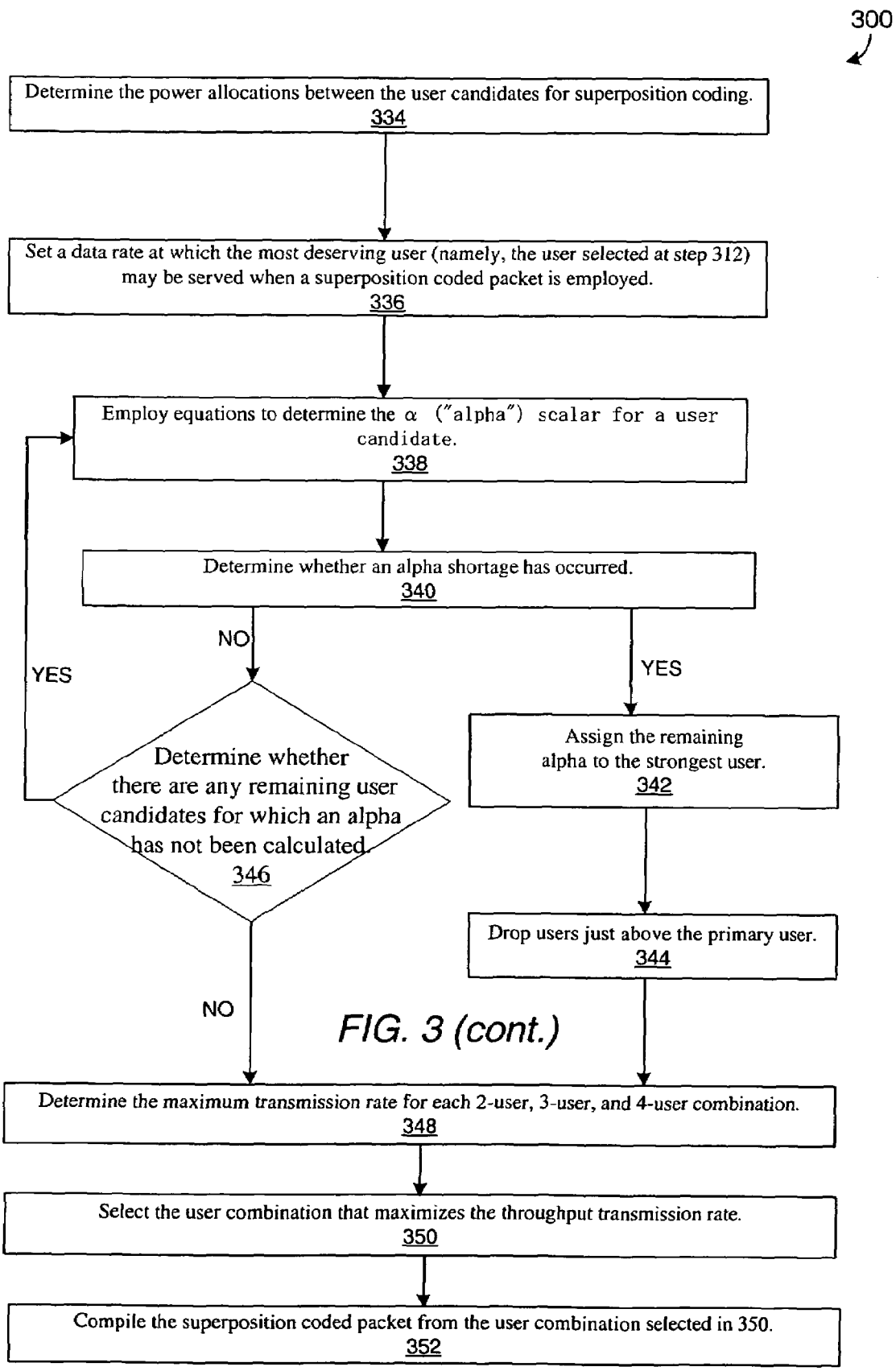

FIG. 3 is a method 300 to compile fixed length information packets into a superposition coded packet having an address header. In radio communications, a forward link traffic channel (e.g., forward link) is typically the link from a fixed location (e.g., a base station) to a mobile user. If the link includes a communications relay satellite, the forward link may consist of both an uplink (base station to satellite) and a downlink (satellite to mobile user).

The forward link channel of method 300 may be of a single data channel that is divided into plural time slots. For reference only, the length of each time slot may be 1.67 milliseconds (msec). As noted above, a base station typically transmits one data packet during a single time slot. For a forward link channel with "i" number of users, method 300 considers the transmission of one or more data packets during a single time slot "n." As will be shown, by transmitting more than one data packet during a single time slot, the method 300 works to improve the data throughput rate on the forward link channel towards the theoretical peak data throughput rate on the forward link channel.

A pilot signal may be viewed as a signal transmitted over a communications system for supervisory, control, equalization, continuity, synchronization, or reference. In method 300, transmitted pilot signals may be used to support channel estimation for coherent detection. At step 302, base station 130 may continuously transmit pilot signals with a constant power. Each AT may then receive a pilot signal.

During its travel from base station 130 to an AT, the intensity or strength of the pilot signal may vary due to the distance from the base station, interference from other base stations, shadowing, short-term fading, and multi-path. Thus, each AT may predict an achievable Signal-to-Interference-and-Noise Ratio (SINR) from its received pilot signal. From the predicted SIR, each AT may compute a Data Rate Control (DRC). The data rate control (sometimes referred to as requested data rate) may represent the information transmission rate that the AT can support in the near future while maintaining a given Packet Error Rate (PER), such as a 1% PER. In other words, the requested DRC may be the best rate at which an AT predicts that it may be reliably served by base station 130 for a given time slot.

At 308, base station 130 may receive a requested DRC from each AT. Each received DRC may represent a request for immediate service by an AT. A present problem with typical wireless communications is that not all s requesting immediate service may be served at the same time. Thus, base station 130 may select those ATs whose needs may be served for a give time slot through resource allocation decisions.

Resource allocation decisions may be concerned with the allocation of limited resources to achieve the best system performances. In method 300 at 310, base station 130 may employ a scheduler to engage a ranking metric, such as a scheduler algorithm, to rank each AT based on a result of an evaluation function that utilizes the requested DRC of each AT. The ranking may be used to determine which data packet(s) may be transmitted during the single time slot "n," preferably to maximize individual data throughput and system data throughput while maintaining some notion of fairness.

Examples of scheduling algorithms include Round Robin (RR), Weighted Round Robin (WRR), Bandwidth On Demand (BOD), and those utilizing delay parameters. Preferably, method 300 employs a scheduling algorithm that attempts to provide a fair (equal) treatment of all the competing ATs while efficiently allocating resources. For example, method 300 may employ the Proportionally fair (P-fair) fairness metric or the Equal Grade of Service (E-GoS) fairness metric at step 310.

Under the P-fair metric, the scheduler may take advantage of the short-term time variations of the forward link channel by scheduling transmissions to ATs during periods where the ATs see strong signal levels. Here, the scheduler may employ the algorithm:

$$F_i(n) = \max_i \left( \frac{DRC_i(n)}{R_i(n)} \right) \quad (1)$$

where, $F_i(n)$ is the evaluation function for user "i" at time slot "n," where i=1, ..., N;

$DRC_i(n)$ is the instantaneous data rate requested by user "i" in the time slot "n";

$R_i(n)$ is the average data rate successfully received by user "i" over a time window of appropriate size; and $\max_i(\cdot)$ returns the maximum value for the determined parenthetical numeric values of user "i."

Using the P-fair metric of equation (1), each user "i" may be served in time slots in which its requested rate is closer to the peak compared to its recent requests. By way of comparison, a scheduler employing an E-GoS metric additionally takes into account the average data rate at which user "i" has requested to be served over a time window of appropriate size. Here, each user "i" may be provided an approximately equal opportunity to receive a data packet without regard to channel condition so as not to penalize a user for moving within the system. In other words, each user "i" may be given enough time for all ATs to achieve the same average data rate over a time window of appropriate size. As an E-GoS metric, the scheduler may employ:

$$F_i(n) = \max_i \left( \frac{DRC_i(n)}{R_i(n)} \times \frac{1}{\langle DRC_i(n) \rangle} \right) \quad (2)$$

where, $\langle DRC_i(n) \rangle$ represents the average data rate requested by user "i" in the given time slot "n" over a time window of appropriate size. As may be determined from equation (2), as the average data rate requested by user "i" decreases, the evaluation function $F_i(n)$ for user "i" increases, making it more likely that user "i" may be served in the given time slot "n" as the average data rate requested by user "i" decreases.

At 312, base station 130 may determine which single user "i" is to be served in the given time slot "n." This decision epoch may be achieved by selecting that user "i" with greatest value for the evaluation function $F_i(n)$. A user having the greatest value for the evaluation function $F_i(n)$ may reflect that such a user is the most deserving (e.g. weakest, but recovering) user. It may be helpful at this point to provide a numerical example.

FIG. 4A is a table listing each user 202 through 240, an example DRC for each user, and an example resulting evaluation function F(n) for each user. Each DRC may be measured in kilobits per second (kbps). FIG. 4B is a table listing of the contents of FIG. 4A as sorted by the DRC for each user. FIG. 4C is a table listing of the contents of FIG. 4A as sorted the resulting evaluation function F(n) for each user. If the results of FIG. 4C were used by base station 130, user 202 would have the greatest value for the evaluation function $F_i(n)$, namely $F_i(n)=45$. Thus, base station 130 may determine that user 202 is the most deserving user and determine at 312 that user 202 is to be served in the given time slot "n."

With the single user "i" is to be served in the given time slot "n" selected at step 312, there may be certain criteria that should be meet before determining whether to bundle the data packet of the most deserving user with other data packets into a superposition coded packet. Thus, method 300 may determine at 314 whether there are any pre-superposition coding criteria and, if there are, method 300 may determine at 316 whether all pre-superposition coding criteria have been met. Pre-superposition coding criteria may be a function of the particular standard employed by a wireless communication system. One very important wireless communication standard is the cdma2000 1xEV-DO standard ("cdma2000 High Rate Packet Data Air Interface Specification," TIA/EIA/IS-856).

The cdma2000 1xEV-DO standard is a system for packet data communication to provide general data communication services in a wireless mobile environment. The 1xEV-DO system adopts intrinsic resource assignment methods corresponding to the characteristics of forward and reverse links. Table 1 below lists the modulation parameters of the 1xEV-DO forward link:

TABLE 1

MODULATION PARAMETERS OF THE 1xEV-DO FORWARD LINK

| Data Rate (kbps) | Interlace Slots Per Packet | Packet Size (bits) | Turbo Code Rate | Modulation | Effective Code Rate |
|---|---|---|---|---|---|
| 38.4 | 16 | 1024 | 1/5 | QPSK | 1/48 |
| 76.8 | 8 | 1024 | 1/5 | QPSK | 1/24 |
| 153.6 | 4 | 1024 | 1/5 | QPSK | 1/12 |
| 307.2 | 2 | 1024 | 1/5 | QPSK | 1/6 |
| 307.2 | 4 | 2048 | 1/3 | QPSK | 16/99 |
| 614.4 | 1 | 1024 | 1/3 | QPSK | 1/3 |
| 614.4 | 2 | 2048 | 1/3 | QPSK | 16/49 |
| 921.6 | 2 | 3072 | 1/3 | 8PSK | 16/49 |
| 1228.8 | 1 | 2048 | 1/3 | QPSK | 2/3 |
| 1228.8 | 2 | 4096 | 1/3 | 16QAM | 16/49 |
| 1843.2 | 1 | 3072 | 1/3 | 8PSK | 2/3 |
| 2457.6 | 1 | 4096 | 1/3 | 16QAM | 2/3 |

In any active slot, the 1xEV-DO forward link may only transmit from a base station to an AT at one of the data rates listed in the left-hand column of Table 1. If the invention is implemented in a wireless communication system employing the cdma2000 1xEV-DO forward link standard, method 300 may make two pre-superposition coding determinations at step 316. First, method 300 may determine at 316 whether the user selected at step 312 (the most deserving user) has a requested DRC of less than a low threshold data rate (e.g., 307.2 kbps for the 1xEV-DO forward link standard). If the user selected at step 312 has a requested DRC of less than 307.2 kbps for example, then a superposition coded packet is not compiled since any gain on the throughput data rate based on a superposition coded packet may be negligible under such circumstances (due to overhead incurred). Also, if the user selected at step 312 has a requested DRC approximately equal to the maximum data rate for the given system (e.g., 3,072.0 kbps for the 1xEV-DO forward link standard), then a superposition coded packet is not compiled since any gain on the throughput data rate based on a superposition coded packet may be negligible under such circumstances. Thus, if any pre-superposition coding criteria have not been met at step 316, method 300 may proceed to step 318 where a superposition coded packet is not compiled. Since the requested DRC of user 202 is 475.7 kbps (see FIG. 4C), method 300 as applied to the present example may determine at 316 that pre-superposition coding criteria have been met (e.g. 307.2 kbps<most deserving user requested DRC<3,072.0 kbps).

If there are no pre-superposition coding criteria at step 314 or if all the pre-superposition coding criteria have been met at step 316, method 300 may proceed to step 320. At step 320, base station 130 may determine whether to add other user data packets to the most deserving user data packet as a superposition coded packet. To achieve this, base station 130 may compile a list of user candidates for superposition coding at step 322. The first user candidate chosen may be the user selected at step 312. A reason for this may be that conventional systems presently serve this most deserving user. By employing the user selected at step 312 as the first potential user candidate for superposition coding, the present invention may be seamlessly incorporated into conventional systems without diminishing the expected operations of that system.

One way to select the remaining user candidates is to select all remaining users. In the present example, this would mean selecting users 204 through 240 of FIG. 2. A problem with this approach is that it is unlikely that the lower ranked users (here, users 224, 230, and 226—see FIG. 4C) would be able to process a superposition coded packet in a timely manner. User 226, for example, may need to decode and reencode the superposition packet nineteen times, a processing period that most likely would extend beyond a 1.67 millisecond time slot. A better approach may be to select the remaining user candidates for superposition coding based on the pre-selected goal of maximizing the throughput transmission rate. This selection also minimizes the overhead required in signaling.

In one embodiment, superposition coding is limited to four users. At 324, method 300 may select as user candidates for superposition coding no more than four users in descending order of their evaluation function $F_i(n)$. The order of the evaluation functions $F_i(n)$ may be ranked by a scheduler. From FIG. 4C, user 202 ($F_{202}(n)$=45), user 204 ($F_{204}(n)$=23), user 232 ($F_{232}(n)$=22), and user 218 ($F_{218}(n)$=20) may be selected as user candidates for superposition coding at step 324.

On first blush, it would seem that the superposition coded packet should always be composed of the maximum number of users (here, four users) since the more superposition coded users, the greater the gain in throughput data rate. However, the implementation of superposition coding requires that each participating AT receive certain information (like initial power allocations and subsequent power updates) about the superposition coded packet. This information takes up byte space in the superposition coded packet to diminish the amount of bytes that may be allocated to the payload data messages being transmitted. A greater number of superposition coded users may result in more overhead (amount of preamble data that needs to be transmitted as part of the superposition coded packet), thus decreasing the data throughput rate. However, a smaller number of superposition coded users may result in a decreased data throughput rate. Thus, to maximize the data throughput rate, method 300 anticipates that the superposition coded packet may include a 2-user, 3-user, or 4-user superposition coded packet depending upon the circumstances.

At 326, method 300 may eliminate from the user candidates of step 324 those user candidates who have a requested DRC that is less than the requested DRC of the most deserving user (e.g., the user selected in step 312). As shown in FIG. 4C, user candidates 204, 232, and 218 all have a requested DRC that is greater than the 475.7 kbps requested DRC of user 202. Thus, none of user candidates 204, 232, and 218 would be eliminated in the present example.

At 328, method 300 may determine whether any user candidates of step 324 have identical requested DRCs. If none of the user candidates of step 324 have identical requested DRCs, then method 300 may proceed to step 334. If any user candidates of step 324 have identical requested DRCs, then method 300 may retain that step 324 user candidate with the highest average DRC (e.g., max⟨DRC⟩) as step 330. At step 332, method 300 may eliminate those remaining step 324 user candidates who had identical requested DRCs as that user retained in step 330. As shown in FIG. 4C, user candidates 202, 204, 232, and 218 all have different requested DRCs, thus none of the user candidates of step 324 would be eliminated in the present example.

At this point, it may be helpful to provide an overview of steps 334 through 352. To select the 2-user, 3-user, or 4-user combination that maximizes the throughput transmission rate, method 300 may compute the power allocations between the user candidates for superposition coding (step 334 through step 346). Method 300 may then determine a maximum transmission rate for each user candidate combination (step 348). From this, method 300 may select the user combination that maximizes the throughput transmission rate (step 350). After selecting the 2-user, 3-user, or 4-user combination that maximizes the throughput transmission rate, method 300 may compile the superposition coded packet from the selected user combination (step 352).

Power allocations between the user candidates for superposition coding (step 334 through step 346) may be related to the maximum transmission rate for each user candidate combination (step 348). To determine the maximum transmission rate $R_i$ for each user combination, method 300 may employ the following equation:

$$R_i = \log_2\left(1 + \frac{\alpha_i P_T}{N_i + \sum_{j>i} \alpha_j P_T}\right) \quad (3)$$

where $R_i$ represents the maximum transmission rate for each user combination;

$P_T$ represents the total power used to transmit a superposition coded packet;

$\alpha$ ("alpha") represents a scalar applied to the total transmitted power $P_T$; and $N_i$ represents the noise spectral power density of the internal noise that may be contributed by a base station to an incoming signal.

Equation 3 may be written as:

$$R_i = \log_2(1 + (E_b/N_t)_i) \quad (4)$$

where $E_b$ is the energy per bit; and where $E_b/N_t$ is the energy per bit per noise spectral power density and is related to the data rate DRC through the SINR by the processing gain of the system.

The $E_b/N_t$ portion of equation (4) may play a role in determining the power allocations between the user candidates for superposition coding. To determine the power allocations between the user candidates for superposition coding, method 300 may employ the following equations to obtain each $\alpha$ ("alpha") total transmission power scalar:

$$(E_b/N_t)_{drc,1} < (E_b/N_t)_{drc,2} < (E_b/N_t)_{drc,3} < (E_b/N_t)_{drc,4} \quad (5)$$

where each $(E_b/N_t)_{drc}$ is based on a requested DRC, and $$(E_b/N_t)_1 = \alpha_1 \times (E_b/N_t)_{drc,1}/[(1-\alpha_1) \times (E_b/N_t)_{drc,1}+1] \quad (6)$$

$$(E_b/N_t)_2 = \alpha_2 \times (E_b/N_t)_{drc,2}/[(1-\alpha_1-\alpha_2) \times (E_b/N_t)_{drc,2}+1] \quad (7)$$

$$(E_b/N_t)_3 = \alpha_3 \times (E_b/N_t)_{drc,3}/[(1-\alpha_1-\alpha_2-\alpha_3) \times (E_b/N_t)_{drc,3}+1] \quad (8)$$

$$(E_b/N_t)_4 = \alpha_4 \times (E_b/N_t)_{drc,4}/[(1-\alpha_1-\alpha_2-\alpha_3-\alpha_4) \times (E_b/N_t)_{drc,4}+1] \quad (9)$$

Method 300 may begin determining the power allocations between the user candidates for superposition coding at step 334. The power allocations between the user candidates for superposition coding may be determined by computing the α ("alpha") scalar for each remaining user candidate.

Terminals far away from the base station require a higher transmit power level at the base station to achieve the same data rate as that for terminals close to the base station in order to overcome the additional path loss. In a 2-user superposition coded packet where 20 watts are available as the total transmitted power, a weak user may require 19 watts of total transmitted power and a strong user may require 1 watt of total transmitted power. Method 300 may achieve this shouting and whispering through the alpha a scalar.

Preferably, method 300 assigns the α ("alpha") scalar from the most deserving user to the strongest user based on their respective requested DRC. FIG. 4B illustrates the most deserving user to the strongest user based on the requested DRC being ranked as follows for the remaining user candidate: user 202, user 218, user 232, and user 204. Thus, method 500 may begin by determining the power allocation of the most deserving user, here user 202.

To determine the power allocation to the most deserving user, method 300 may set a data rate at step 336 at which the most deserving user (namely, the user selected at step 312) may be served when a superposition coded packet is employed. For the 1xEV-DO forward link standard, the served data rate for the most deserving user in the superposition coded packet may be the greater of 153.6 kbps and the most deserving user's DRC divided by then number of users in the superposition coded packet. This may be written as:

Served Data Rate$_{(most\ deserving\ user)}$=max(153.6 kbps, (DRC$_{(most\ deserving\ user)}$/number of SP users)) (4)

In the example of FIG. 4C, the requested DRC of the most deserving user (user 202) is 475.7 kbps. Applying equation 3, Served Data Rate$_{(most\ deserving\ user)}$=max(153.6 kbps, 475.7/2, 475.7/3, 475.7/4), or Served Data Rate$_{(most\ deserving\ user)}$=max (153.6 kbps, 237.9 kbps, 158.6 kbps, 118.9 kbps), or Served Data Rate$_{(most\ deserving\ user)}$=237.9 kbps.

Knowing the Served Data Rate $_{(most\ deserving\ user)}$ and the requested DRC for the most deserving user (from e.g., FIG. 4C), method 300 may employ equations to determine the α ("alpha") scalar for a user candidate at step 338. In the present example, method 300 may employ equation (6) above to determine the α ("alpha") scalar for the most deserving user. For user 202, the Served Data Rate was calculated from equation (4) as 237.9 kbps and the requested DRC from FIG. 4C is 475.7 kbps. Thus, for user 202, the $\alpha_{202}$ ("alpha") scalar may be calculated from equation (6) as:

$$(E_b/N_t)_1 = \alpha_1 \times (E_b/N_t)_{drc,1}/[(1-\alpha_1) \times (E_b/N_t)_{drc,1}+1] \quad (6)$$

substituting, $$(E_b/N_t)_{202} = \alpha_{202} \times (E_b/N_t)_{drc,202}/[(1-\alpha_{202}) \times (E_b/N_t)_{drc,202}+1] \quad (6a)$$

$$237.9\ kbps = \alpha_{202} \times 475.7\ kbps/[(1-\alpha_{202}) \times (475.7\ kbps+1]] \quad (6b)$$

$$\alpha_{202} = 0.9958 (= \alpha_1) \quad (6c)$$

At step 340, method 300 may determine whether an alpha shortage has occurred. An alpha shortage is where the sum of all alphas is equal to or greater than one. If an alpha shortage has occurred, then method 300 may assign the remaining alpha to the strongest user at step 342 and may drop users just above the primary user at step 344. This maximizes the total throughput. The method 300 then may proceed to step 348.

If an alpha shortage has not occurred, then method 300 may determine at step 346 whether there are any remaining user candidates for which an alpha has not been calculated. If there are remaining user candidates for which an alpha has not been calculated, method 300 returns to step 338. For the next strongest user 218, the $\alpha_{218}$ ("alpha") scalar may be calculated from equation (7) since $\alpha_1$ (here, $\alpha_{202}$) has been calculated from equation (6). The $\alpha_{232}$ scalar and the $\alpha_{204}$ scalar similarly may be determined from equation (8) and equation (9) respectively. If an alpha has been calculated for each user candidate, method 300 may proceed to step 348.

Method 300 may begin to determine the maximum transmission rate for each user 2-user, 3-user, and 4-user combination at step 348. Recall that the maximum transmission rate $R_i$ for each user combination, method 300 may employ the following equation:

$$R_i = \log_2\left(1 + \frac{\alpha_i P_T}{N_i + \sum_{j>i} \alpha_j P_T}\right) \quad (3)$$

For user candidates 1, 2, 3, and 4, method 300 may employ the following equations to determine the maximum transmission rate for each user candidate combination:

$$R_1 = \log_2\left(1 + \frac{\alpha_1 P_T}{N_1}\right) \quad (10)$$

$$R_2 = \log_2\left(1 + \frac{\alpha_2 P_T}{N_2 + \alpha_1 P_T}\right) \quad (11)$$

$$R_3 = \log_2\left(1 + \frac{\alpha_3 P_T}{N_3 + \alpha_2 P_T + \alpha_1 P_T}\right) \quad (12)$$

$$R_4 = \log_2\left(1 + \frac{\alpha_4 P_T}{N_4 + \alpha_3 P_T + \alpha_2 P_T + \alpha_1 P_T}\right) \quad (13)$$

Each of the variables in equations (10) through (13) may be known at this point in the process. The alpha a power transmission scalar for each user candidate may have been determined during step 334 through step 346. The total transmission power $P_T$ typically may be assigned by the wireless communication system. The noise spectral power density N for each user candidate is the internal base station noise that may be contributed by a base station to each user candidate's incoming signal and thus is known (possibly through the DRC requested). By employing equations (10) through (13), the maximum transmission rate for each user candidate combination may be determined at step 348.

At step 350, method 300 may select the user combination that maximizes the throughput transmission rate. For example, if $R_2$=70 kbps for a 2-user superposition coded packet, $R_3$=80 kbps for a 3-user superposition coded packet, and $R_4$=75 kbps for a 4-user superposition coded packet, method 300 may select the 3-user superposition coded packet since the 3-user superposition has the largest kbps and thus maximizes the throughput transmission rate.

At step 352, method 300 may compile the superposition coded packet from the selected user combination. The superposition coded packet may include a payload and a preamble. The payload may include each data packet for the users included in the selected user combination. The preamble (or address header) may convey superposition coded parameters of the packet and non-superposition coded parameters of the packet.

Superposition coded packet parameters may include: (a) the number of users in the superposition coded packet; (b) the length (nominal # of interlace slots) of the superposition Conveying preamble information is viewed as overhead in that packet bit space allocated preamble information takes away packet bit space that may be allocated to the payload. As discussed in more detail below, the most deserving user may process the superposition coded packet without information regarding the superposition coded packet parameters. Thus, the superposition coded packet may be compiled such that the most deserving user may not receive any superposition coded packet parameter information in the preamble, but still may receive non-superposition coded packet parameters in the preamble. Table 2 below illustrates an example superposition coded packet structure for a 3-user superposition coded packet with the bit allocation shown in parenthesize:

TABLE 2

EXAMPLE 3-USER SUPERPOSITION CODED PACKET STRUCTURE

| USER | Superposition Coded (SPC) Packet Parameters | | | | | | | | | | non-SPC parameters | Payload |
|---|---|---|---|---|---|---|---|---|---|---|---|---|
| #1 | (0) | | | | | | | | | | non-SPC parameters (20) | Data Packets 1(4096) 2(1024) 3(1024) |
| #2 | # SPC Users (2) | MAC ID SP #1 (7) | $\alpha_1$ (3) | Payload size (2) | MAC ID SP #2 (7) | $\alpha_2$(3) | Payload size (2) | MAC ID SP #3 (7) | $\alpha_3$ (3) | Payload size (2) | non-SPC parameters (20) | Data Packets 1(4096) 2(1024) 3(1024) |
| #3 | # SPC Users (2) | MAC ID SP #1 (7) | $\alpha_1$ (3) | Payload size (2) | MAC ID SP #2 (7) | $\alpha_2$ (3) | Payload size (2) | MAC ID SP #3 (7) | $\alpha_3$ (3) | Payload size (2) | non-SPC parameters (20) | Data Packets 1(4096) 2(1024) 3(1024) | coded packet; (c) the fractional power allocation ($\alpha_i$) for each superposition coded packet user "i"; (d) the payload size for each superposition coded packet user; (e) the physical address of each superposition coded user; and (f) whether the packet is a single-user data packet, a multi-user data packet, or a multi-user, superposition coded packet.

A two bit code may be needed to indicate the number of users ($2=01_2$, $3=10_2$, $4=11_2$) in the superposition coded packet. The length (nominal # of interlace slots) of the superposition coded packet also may be indicated by two bits of code. The fractional power allocation ($\alpha_i$) for each superposition coded packet user "i" may be conveyed by 3-bits and the payload size (the type of packet) for each superposition coded packet user may be conveyed by 2-bits. Seven bits may be allocated to convey a physical address (e.g., Medium Access Control Identifier (MAC ID)) of each superposition coded user.

An AT may utilize the number of users to determine whether the packet is a single-user data packet ($00_2$) or a multi-user packet ($01_2$, $10_2$, $11_2$). If the packet is a multi-user packet, then the AT may utilize the power allocation to distinguish between a multi-user data packet and a multi-user, superposition coded packet. A multi-user data packet always is transmitted at full power ($P_T$) and a multi-user, superposition coded packet is transmitted by scaled power ($\alpha P_T$).

Other packet parameters (non-superposition coded packet parameters) may need to be conveyed by the preamble depending on the communication standard in which the invention is employed. In order to incorporate the superposition coding strategy, the preamble may need to distinguish the superposition coded packet from the other types of data packets, such as single user packet, multi-user packet, control channel packet, and broadcast packet.

Figure 5:
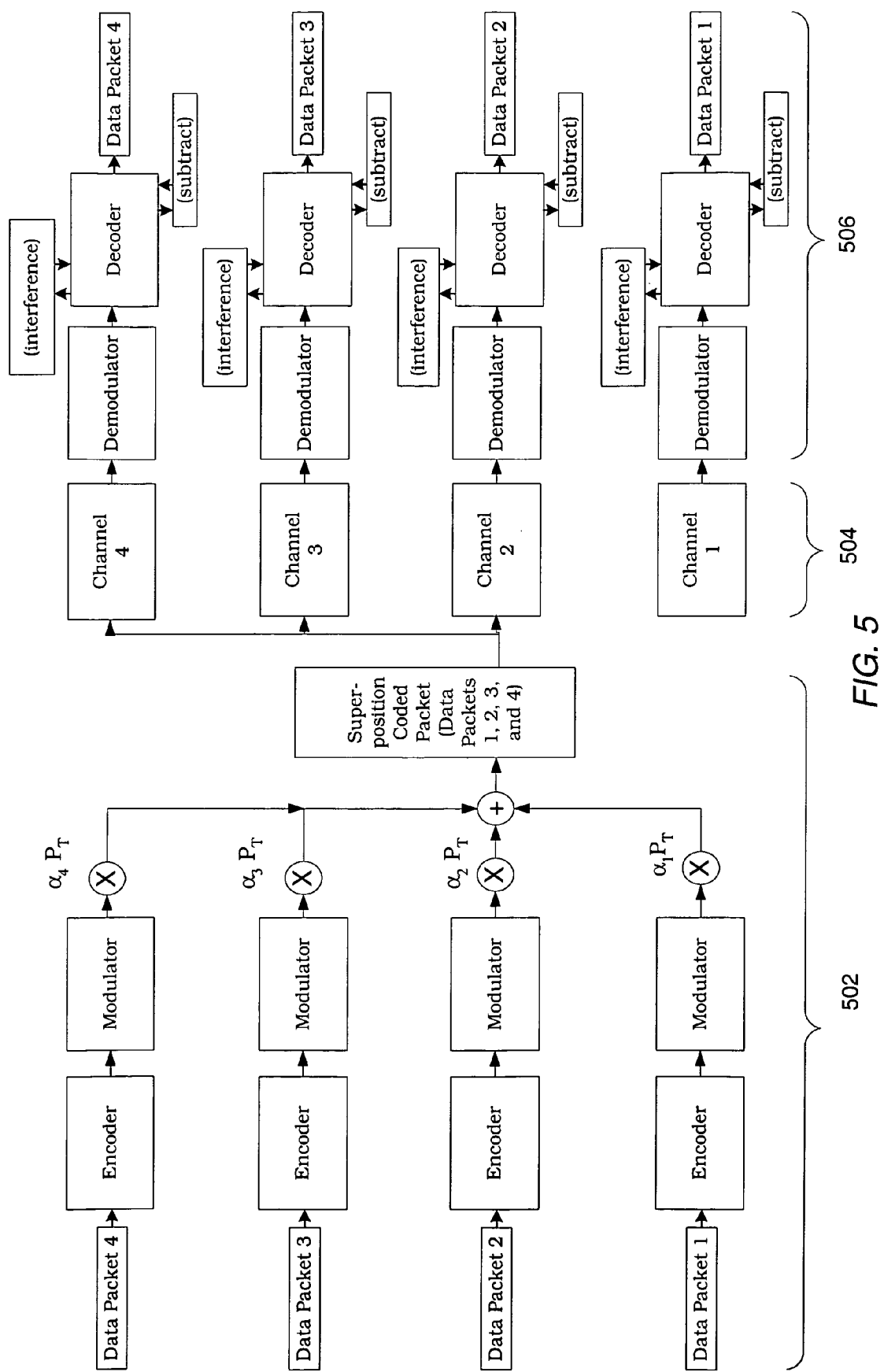
FIG. 5 is a flow diagram 500 to compile, transmit, and process a superposition coded packet.

FIG. 5 is a flow diagram 500 to compile, transmit, and process a superposition coded packet. Individual data packets may be encoded, modulated, transmission power (alpha "$\alpha$") scaled (namely, $\alpha_i P_T$), and then added together to compile a superposition coded packet in region 502. The superposition coded packet may then be transmitted over each forward link channel in region 504. Each AT may then receive and process the superposition coded packet in region 506.

Figure 6:
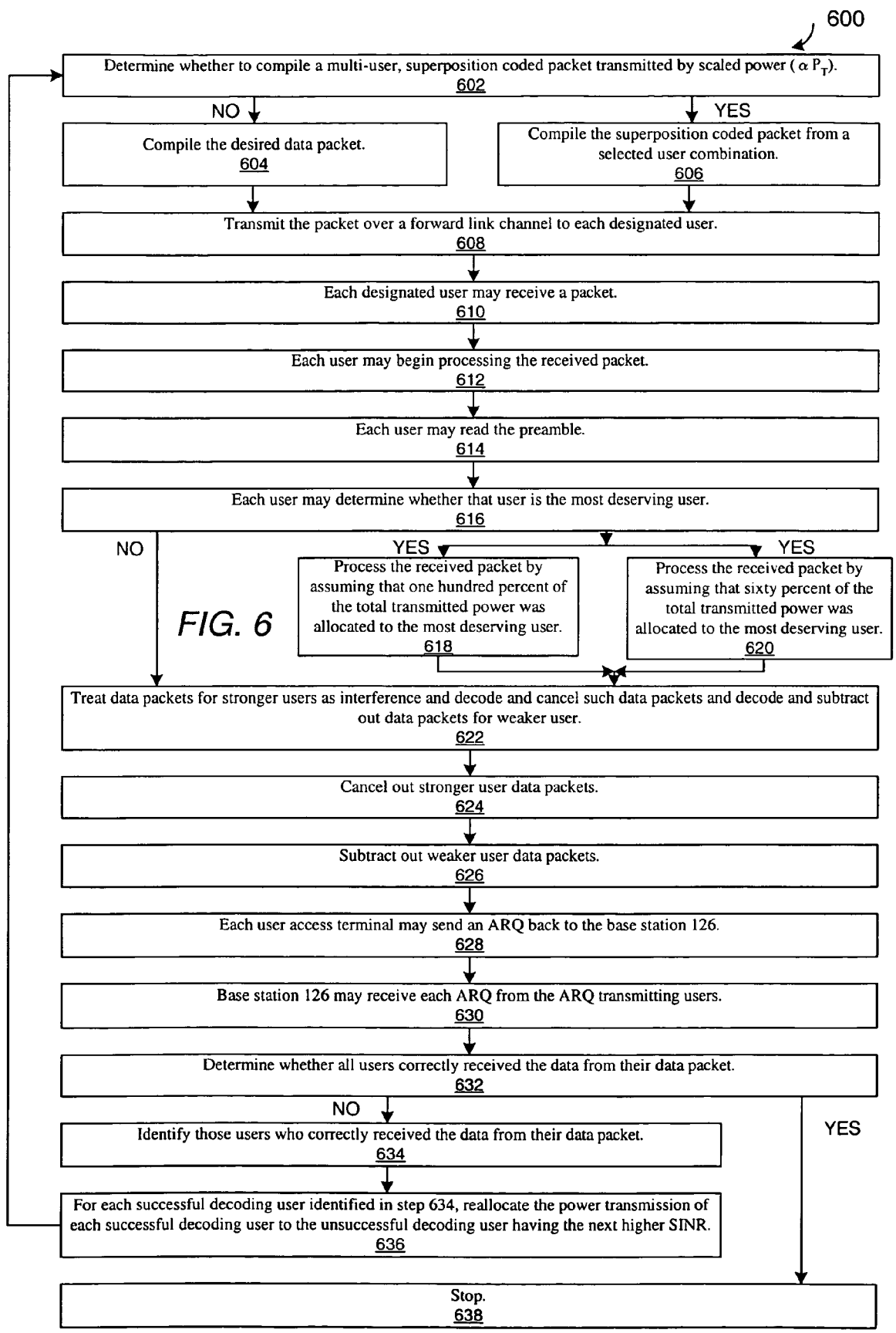
FIG. 6 is a method 600 to compile, transmit, and process one or more data packets.

FIG. 6 is a method 600 to compile, transmit, and process one or more data packets. Base station 130 may determine whether to compile a single-user data packet, a multi-user data packet transmitted at full power, or a multi-user, superposition coded packet transmitted by scaled power ($\alpha P_T$). At step 602, base station 130 may determine whether to compile a superposition coded packet transmitted by scaled power ($\alpha P_T$). Base station 130 may make this determination based on method 300. If base station 130 decides to compile a single-user data packet or a multi-user data packet transmitted at full power, method 600 may proceed to step 604 where base station 130 may compile the desired data packet. From step 604, method 600 may proceed to step 608.

If base station 130 decides at step 602 to compile a multi-user, superposition coded packet, method 600 may proceed to step 606. At step 606, method 600 may compile the superposition coded packet from a selected user combination. This may be achieved by employing method 300. At step 608, method 600 may transmit the superposition coded packet over a forward link channel to each user in the selected user combination. Each user in the selected user combination may receive the superposition coded packet at step 610.

In the present example, assume that data packets for all four users 202, 204, 232, and 218 are contained within the superposition coded packet. For a user to obtain the data packet meant for that user, the user may process the superposition coded packet. Thus, at step 612, each user may begin processing the received superposition coded packet.

As a first step in processing the received superposition coded packet, each user may read the preamble at step 614. As noted above, the most deserving user need not receive any superposition coded packet parameter information in the preamble to process the superposition coded packet.

At 616, each user may determine whether that user is the most deserving user. For example, if the received preamble contains superposition coded packet parameters (the MAC ID), then that user may know that it is not the most deserving user and method 600 may proceed to step 622. If the received preamble does not contain any superposition coded packet parameters, then that user may know it is the most deserving user. In one embodiment, the super-position coded packet contains a multi-user packet which is transmitted to the most deserving user with less than 100% power allocation. This multi-user packet also contains information about the superposed users and their payload size and initial power allocation.

If a user determines that it is the most deserving user at step 616, then that user may attempt to process the received packet at 618 by assuming that one hundred percent of the total transmitted power was allocated to the most deserving user. If ultimately successful, then this means that the received packet was either a single-user data packet ($\alpha=1.00$), a multi-user data packet transmitted at full power ($\alpha=1.00$), or a superposition coded packet in which the disparity between the most deserving user's SINR and the next most deserving user's SIR was so large that nearly all of the transmitted power was allocated to the most deserving user. The most deserving user also may attempt to process the received packet at 620 by assuming that sixty percent of the total transmitted power was allocated to the most deserving user. From step 618 and 620, method 600 may proceed to step 622.

To process a superposition coded packet at step 622, a user (i) treats the data packets for stronger users as interference and (ii) decodes and subtracts out data packets meant for weaker user. By subtracting out weaker user data packets, each user may obtain the data packet intended for that user.

Treating data packets as interference and canceling such data packets may be achieved by successive interference cancellation. In Successive Interference Cancellation (SIC), each user's signal may be demodulated and canceled in order from the most deserving signal to the strongest signal according to their scaled transmission power ($\alpha_i P_T$) value. The scaled transmission power value is known since each scaled transmission power value is transmitted as part of the preamble to the superposition coded packet. The successive cancellations of the interference may be carried out as follows:

i) Recognize the weaker signal(s);
    ii) Decode the weaker user(s);
    iii) Determine the amplitude of the decoded user from the superposition coding parameters;
    iv) Regenerate (re-construct or re-encode) the weaker user(s)' signal;
    v) Cancel the weaker user; and
    vi) Repeat until all weaker users are decoded.

Thus, to process the superposition coded packet at step 622, method 600 may cancel out weaker user(s) data packets at step 624 and subtract out weaker user data packets at step 626 to process a superposition coded packet. In the present example, user 202 treat all other users as interference since user 202 is the most deserving user. Table 3 below identifies the technique each of users 202, 204, 232, and 218 may employ to obtain the desired data packet from the superposition coded packet:

TABLE 3

SUPERPOSITION CODED PACKET PROCESSING

| USERS\PACKETS | PAC 218 | PAC 232 | PAC 204 | PAC 202 |
|---|---|---|---|---|
| USER 202 | treat as interference | | | (−) |
| USER 204 | treat as interference | | (−) | subtract |
| USER 232 | treat as interference | (−) | subtract | subtract |
| USER 218 | (−) | subtract | subtract | subtract |

During the processing of a data packet, an AT decoder may correctly process the data packet. Alternatively, the AT decoder may detect errors and be unable to process the data packet correctly. In either case, the AT may send an Acknowledgement (positive or negative) to the base station to inform the base station of the AT's success in processing a data packet.

Automatic Repeat Request (ARQ) schemes provide for an automatic retransmission of data. Hybrid ARQ (H-ARQ) systems allow for early termination of such retransmissions when data is decoded correctly. The receiver AT may inform the transmitter base station as to whether the base station needs to re-send a data packet to that particular AT. A positive Acknowledgement (ACK) may be returned when the data is received correctly and a Negative Acknowledgement (NACK) may be returned when an error is detected. A negative acknowledgement may be silence (no return ARQ) and a positive acknowledgement may be a return ARQ. In a more complex error control system, information blocks may be encoded for partial error correction at the AT receiver and additional, uncorrected errors may be retransmitted by the base station. Method 600 may utilize a variety of error control system and each user AT may send an ARQ back to the base station 126 at step 628.

At step 630, base station 130 may receive each ARQ from the superposition coded packet users. Recall that the total transmit power ($P_T$) behind the superposition coded packet is allocated to each data packet contained in the superposition coded packet based on the alpha $\alpha$ scalar (namely, $\alpha_i P_T$). If a user correctly receives data from a data packet, then the base station need not resend that user its particular data packet. Thus, if a user terminates their request for re-transmission of a data packed before the last slot of the slot interlace, the transmit power originally allocated to that user may be redistributed among the remaining users. This may be referred to as dynamic alpha updating.

During each interlace slot, method 600 may re-send those data packet for which an NACK-ARQ was received. Table 4 below illustrates an example 4-slot interlace:

TABLE 4

FOUR-SLOT INTERLACE

| USERS/SLOTS | SLOT #1 | SLOT #2 | SLOT #3 | SLOT #4 |
|---|---|---|---|---|
| U1: USER 202 | X | X | X | ✓ |
| U2: USER 204 | ✓ | (−) | (−) | (−) |
| U3: USER 232 | X | X | ✓ | (−) |
| U4: USER 218 | X | ✓ | (−) | (−) |

The users listed in Table 4 are arranged from the most deserving user 202 (lowest reported SINR) to the strongest user (highest reported SINR). After the completion of the first interlace slot, user 2 (user 204) correctly received data from the superposition coded packet and the remaining users (1, 3, and 4) experienced errors. A reason user 2 correctly received data from the superposition coded packet after the first interlace slot may be that user 2 had better forward link channel than predicted.

Base station 130 may allocate the transmission power for user 2 (user 204) to user 3 (user 232) as indicated by the arrow in Table 3. After the second interlace slot, user 4 correctly received data. Thus, base station 130 allocated the transmission power for early terminating user 4 to the user who both experienced errors and requested the next highest SINR, namely user 3. After the third interlace slot, user 3 correctly received data and base station 130 allocated the transmission power for user 3 to user 1.

In view of the above, method 600 may determine at step 632 whether all users correctly received the data from their data packet. If all users correctly received the data from their data packet, then method 600 may proceed to step 638 and terminate. If all users did not correctly receive the data from their data packet, then method 600 may identify at step 634 those users who correctly received the data from their data packet. For each successful decoding user identified in step 634, method 600 may reallocate at step 636 the power transmission of each successful decoding user to the unsuccessful decoding user having the next higher SINR. Method 600 then may return to step 602 and compile a data packet for the next time slot interlace.

On returning to step 602, base station 130 may determine whether to compile a single-user data packet or a multi-user, superposition coded packet based on the ARQs received by base station in step 630. If only one user experienced errors in decoding its data packet, then base station 130 need only compile a single-user data packet. Moreover, in compiling the data packet for the next time slot interlace, some of the preamble bits may be discarded since there may be less data packets to send during the particular time slot interlace. Discarding preamble bits may reduce the amount of data to be transmitted and therefore increase the rate at which that data may be transmitted. Method 600 may repeat in this fashion until all users correctly receive the data from their data packet.

The invention may be embodied in a computer chip for the base station to address the compiling, transmitting, and retransmitting of a superposition coded packet and a computer chip for each AT to address the processing of a received superposition coded packet. This may require invoking the scaling and adding features of an existing base station computer chip and including a decoder, subtractor, and re-encoder in existing AT computer chips. The method of the invention may be employed each time the base station computer chip compiles a superposition coded packet, where the owner of the invention may charge a fee each time the base station computer chip compiles a superposition coded packet.

Figure 7:
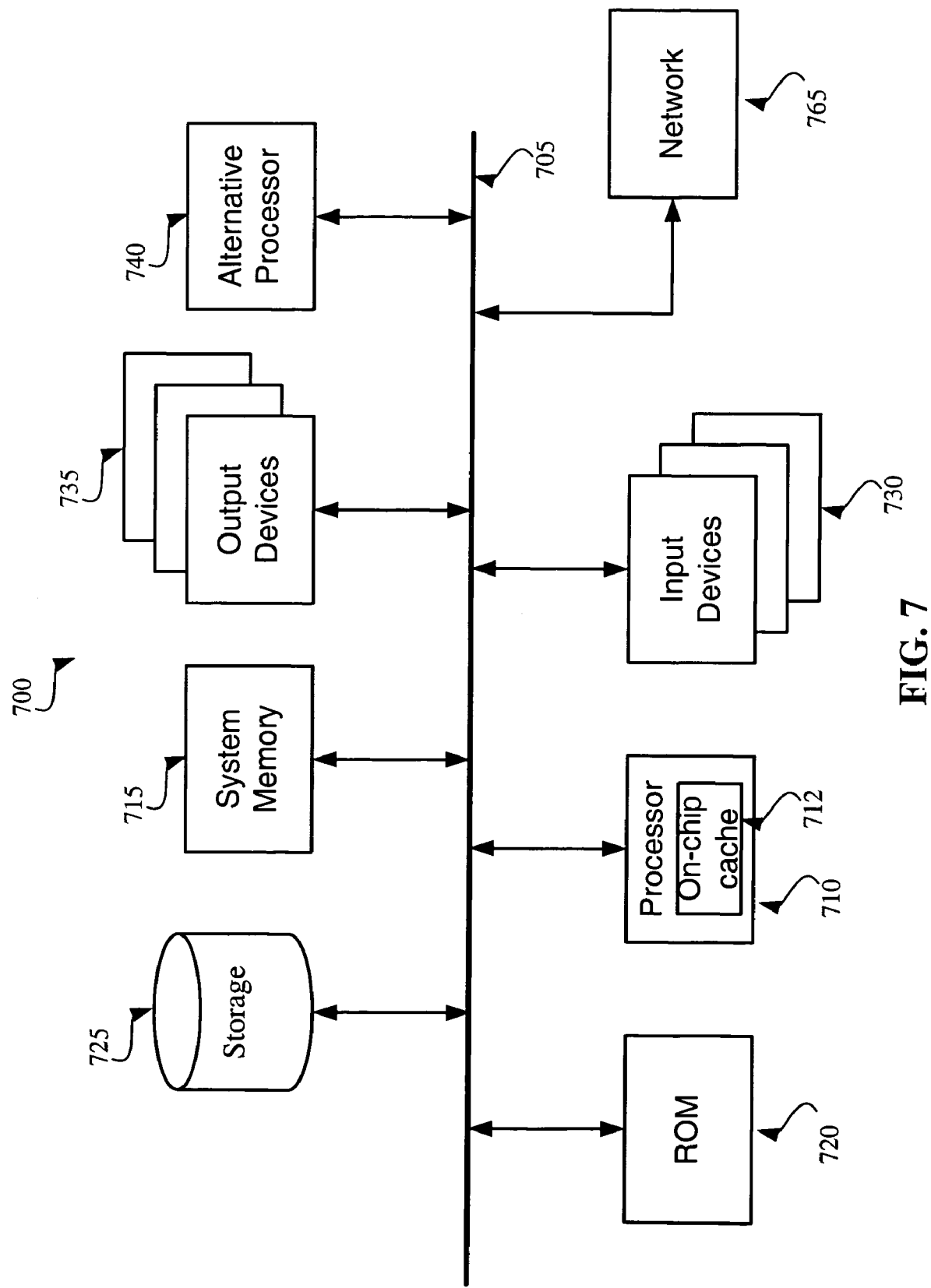
FIG. 7 is a computer system 700 with which some embodiments of the invention may be implemented.

FIG. 7 is a computer system 700 with which some embodiments of the invention may be implemented. In some embodiments, the techniques of the present invention may be hard-coded into hardware devices dedicated specifically for graphics production and/or implemented in computer executable instructions stored in a computer readable medium (software).

The computer system 700 may include a bus 705, a processor 710, a system memory 715, a read-only memory 720, a permanent storage device 725, input devices 730, output devices 735, and an alternative processor 740. Some or all of the items of computer system 700 may be included in a compiling unit or included in a control processor.

The bus 705 may collectively represent all system, peripheral, and chipset buses that communicatively connect the numerous internal devices of the computer system 700. For instance, the bus 705 may communicatively connect the processor 710 with the read-only memory 720, the system memory 715, and the permanent storage device 725.

The Read-Only-Memory (ROM) 720 may store static data and instructions which may be needed by the processor 710 and other modules of the computer system. The permanent storage device 725, on the other hand, may be a read-and-write memory device. This device may be a non-volatile memory unit that stores instruction and data even when the computer system 700 may be off. Some embodiments of the invention may utilize a mass-storage device (such as a magnetic or optical disk and its corresponding disk drive) as the permanent storage device 725. Other embodiments may utilize a removable storage device (such as a floppy disk or other storage disk, and corresponding disk drive) as the permanent storage device.

Like the permanent storage device 725, the system memory 715 may be a read-and-write memory device. However, unlike storage device 725, the system memory may be a volatile read-and-write memory, such as a random access memory (RAM). The system memory may store some of the instructions and data that the processor needs at runtime.

In some embodiments, instructions and/or data needed to perform methods of the present invention may be stored in the system memory 715, the permanent storage device 725, the read-only memory 720, or any combination of the three. For example, the various memory units may contain instructions of an application and/or graphics data generated by the application. In some embodiments, the system memory 715 and/or the permanent storage device 725 may comprise a cache and/or buffer.

From these various memory units, the processor 710 may retrieve instructions to execute and data to process to perform the processes of the present invention. In some embodiments, the processor 710 may utilize an on-chip cache 712 to hold data recently accessed or produced by the processor 710. In some embodiments, the alternative processor 740 may execute instructions and processes data to perform the processes of the present invention.

The bus 705 also may connect to the input and output devices 730 and 735. The input devices 730 may enable a user to communicate information and select commands to the computer system 700. The input devices 730 may include alphanumeric keyboards and cursor-controllers. The output devices 735 may print or display images generated by the computer system 700. The output devices may include printers and display devices, such as Cathode Ray Tubes (CRT) or Liquid Crystal Displays (LCD).

Finally, as shown in FIG. 7, the bus 705 also may couple the computer system 700 to a network 765 through, for example, a network adapter (not shown). In this manner, the computer system 700 may be a part of a network of computers (such as a Local Area Network ("LAN"), a Wide Area Network ("WAN"), or an Intranet) or a network of networks (such as the Internet). Any or all of the components of the computer system 700 may be used in conjunction with the present invention. However, one of ordinary skill in the art would appreciate that any other system configuration also may be used in conjunction with the present invention.

The above invention is expected to provide throughput gains in a variety of systems, including Evolution-Data Only (Time Division Multiplexing) (EV-DO (TDM)), Flash-Orthogonal Frequency Division Multiplexing (Flash-OFDM (TDM OFDM)), and 1x Code Division Multiplexing (1x-

CDM). The largest throughput gains are expected for strong users operating in time-orthogonal systems The above invention may be applied to a variety of applications. For example, when applied to the Voice-Over-Internet Protocol (VoIP), the inventive superposition coding on the 1x-EV-DO forward link may allow for lower latencies (reduced transmission delays), a greater number of users per sector (namely, a higher capacity), or a combination of the two. When applied to broadcast services such as advertising, the broadcast services may be superposition coded with unicast traffic directed to an individual user so that both broadcast and unicast traffic may be transmitted together. Thus, unlike conventional wireless communication systems, the present invention minimizes or eliminates the need to preempt broadcast traffic with unicast traffic. In other words, broadcast traffic need not be compromised during periods of unicast traffic for those systems employing the present invention.

While the invention has been described with reference to numerous specific details, one of ordinary skill in the art will recognize that the invention may be embodied in other specific forms without departing from the spirit of the invention. Thus, one of ordinary skill in the art would understand that the invention is not to be limited by the foregoing illustrative details, but rather is to be defined by the appended claims.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Moreover, method steps may be interchanged without departing from the scope of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may be read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or utilize the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to compile a superposition coded packet, the method comprising:
   compiling at a base station a plurality of user candidates for superposition coding;
   determining a first user candidate among the plurality of user candidates, the first user candidate having a requested data rate;
   producing a user combination by eliminating from the plurality of user candidates those user candidates having a requested data rate less than the requested data rate of the first user candidate; and
   compiling a superposition coded packet for the user combination.

2. The method of claim 1, wherein compiling the plurality of user candidates for superposition coding includes selecting no more than four user candidates.

3. The method of claim 2, wherein the no more than four user candidates are selected in descending order of a result of an evaluation function $F_i(n)$.

4. The method of claim 1, wherein compiling a superposition coded packet includes preparing a preamble without including superposition coded packet parameters for the first user candidate.

5. The method of claim 1, further comprising:
   eliminating from the plurality of user candidates those user candidates who both have identical requested data rates and have an average requested data rate less than a maximum average data rate.

6. The method of claim 1, wherein eliminating from the user candidates includes selecting a user combination to maximize a throughput transmission rate.

7. The method of claim 6, wherein selecting the user combination to maximize the throughput transmission rate includes at least one of (i) determining a maximum transmission rate for each user, (ii) setting a data rate for serving the first user candidate, and (iii) determining whether an alpha shortage has occurred.

8. The method of claim 1, wherein eliminating from the user candidates includes eliminating those user candidates for which acknowledge was not received by the base station.

9. The method of claim 8, further comprising:
reallocating a power transmission of each eliminated user candidate to a remaining user candidate having a highest Signal-to-Interference-and-Noise Ratio.

10. A method as in claim 1, wherein the requested data rate is transmitted as a Data Rate Control (DRC) message.

11. The method of claim 1, wherein the superposition coded packet includes two or more combined data packets.

12. The method of claim 1, wherein the superposition coded packet is sent to more than one user candidate.

13. A base station apparatus comprising:
a compiling unit configured to compile a plurality of user candidates for superposition coding;
a control processor configured to determine a most deserving user among the plurality of user candidates, configured to produce a user combination by eliminating from the plurality of user candidates those user candidates who have a requested data rate that is less than a requested data rate of the most deserving user, and configured to compile a superposition coded packet from the user combination.

14. The base station as in claim 13, wherein the requested data rate is received at the base station as a Data Rate Control (DRC) message.

15. The base station apparatus of claim 13, wherein the compiling unit further is configured to compile the plurality of user candidates for superposition coding by selecting no more than four user candidates.

16. The base station apparatus of claim 15, wherein the compiling unit further is configured to select the no more than four user candidates in descending order based on a result of an evaluation function $F_i(n)$.

17. The base station apparatus of claim 13, wherein the compiling unit is configured to compile the superposition coded packet by preparing a preamble without superposition coded packet parameters for the most deserving user.

18. The base station apparatus of claim 13, wherein the control processor further is configured to eliminate from the plurality of user candidates, those user candidates, who both have identical requested data rates and have an average DRC that is less than the maximum average requested data rate for these same user candidates who have identical requested data rate.

19. The base station apparatus of claim 13, wherein the control processor further is configured to eliminate from the plurality of user candidates by selecting a user combination that maximizes a throughput transmission rate.

20. The base station apparatus of claim 19, wherein the control processor further is configured to select the user combination that maximizes the throughput transmission rate by performing at least one of (i) determining the maximum transmission rate for each user, (ii) setting a data rate at which the most deserving user is to be served, and (iii) determining whether an alpha shortage has occurred.

21. The base station apparatus of claim 13, wherein the control processor further is configured to eliminate from the plurality of user candidates by eliminating those user candidates for which an acknowledge message was not received by the base station.

22. The base station apparatus of claim 21, wherein the control processor further is configured to reallocate a power transmission of each eliminated user candidate to a remaining user candidate having a highest signal-to-interference-and-noise ratio.

23. An apparatus to compile a superposition coded packet, the apparatus comprising:
means for compiling a plurality of user candidates for superposition coding;
means for determining a most deserving user among the plurality of user candidates, for producing a user combination by eliminating from the plurality of user candidates those user candidates who have a requested data rate (requested DRC) that is less than a requested DRC of the most deserving user, and for compiling a superposition coded packet from the user combination.

24. The apparatus of claim 23, wherein the means for compiling a plurality of user candidates is a compiling unit.

25. The apparatus of claim 23, wherein the means for determining a most deserving user is a control processor.

26. An apparatus to compile a superposition coded packet:
means for determining compiling at a base station a plurality of user candidates for superposition coding;
means for a first user candidate among the plurality of user candidates, the first user candidate having a requested data rate;
means for producing a user combination by eliminating from the plurality of user candidates those user candidates having a requested data rate less than the requested data rate of the first user candidate; and
means for compiling a superposition coded packet for the user combination.

27. The apparatus of claim 26, wherein means for compiling the plurality of user candidates for superposition coding comprises means for selecting no more than four user candidates.

28. The apparatus of claim 27, wherein the means for selecting comprises means for selecting in descending order based on a result of an evaluation function $F_i(n)$.

29. The apparatus of claim 26, wherein means for compiling a superposition coded packet comprises means for preparing a preamble without including superposition coded packet parameters for the first user candidate.

30. The apparatus of claim 26, further comprising:
means for eliminating from the plurality of user candidates those user candidates having both identical requested data rates and an average requested data rate less than a maximum average data rate.

31. The apparatus of claim 30, wherein means for eliminating comprises: means for selecting a user combination to maximize a throughput transmission rate.

32. The apparatus of claim 31, wherein means for selecting comprises at least one of (i) means for determining a maximum transmission rate for each user, (ii) means for setting a data rate for serving the first user candidate, and (iii) means for determining whether an alpha shortage has occurred.

33. The apparatus of claim 30, wherein means for eliminating comprises:
means for eliminating those user candidates for which acknowledge was not received by the base station.

34. The apparatus of claim 33, further comprising:
means for reallocating a power transmission of each eliminated user candidate to a remaining user candidate having a highest signal-to-interference-and-noise ratio.

35. The apparatus as in claim 26, wherein the requested data rate is transmitted as a Data Rate Control (DRC) message.

36. A computer readable medium comprising program code that when executed in a mobile device causes the mobile device to:
compile at a base station a plurality of user candidates for superposition coding;

determine a first user candidate among the plurality of user candidates, the first user candidate having a requested data rate;

produce a user combination by eliminating from the plurality of user candidates those user candidates having a requested data rate less than the requested data rate of the first user candidate; and compile a superposition coded packet for the user combination.

37. A processor comprising:

a processing circuit configured to compile at a base station a plurality of user candidates for superposition coding;

determine a first user candidate among the plurality of user candidates, the first user candidate having a requested data rate;

produce a user combination by eliminating from the plurality of user candidates those user candidates having a requested data rate less than the requested data rate of the first user candidate; and compile a superposition coded packet for the user combination.

\* \* \* \* \*